United States Patent Office 3,006,931
Patented Oct. 31, 1961

3,006,931
ESTRATRIENE SERIES COMPOUNDS AND
THEIR PRODUCTION
Masamoto Nishikawa, Nishinomiya, and Hikoichi Hagiwara, Osaka, Japan, assignors to Takeda Pharmaceutical Industries, Ltd., Higashi-ku, Osaka, Japan
No Drawing. Filed Feb. 5, 1959, Ser. No. 791,259
Claims priority, application Japan Feb. 7, 1958
7 Claims. (Cl. 260—397.4)

This invention relates to estratriene series compounds and their production.

Since 1930 when estrone was first discovered in the urine of pregnant mares, estrone, estradiol, etc. have been produced by extraction from such urine. As these compounds are useful as female sex hormone (follicular hormone), many researchers have continued their study for establishing the synthetic production of these compounds, and some of these researchers have succeeded in the total synthesis of some of these hormones. Difficulties, however, have always been present in the separation of the objective compounds from the mixture obtained as the product of the total synthesis, because the mixture is always composed of many stereoisomers due to their many asymmetric carbon atoms. This is understandable from the fact that, even in estrone, one of the simplest compounds in this series, for example, there exist theoretically sixteen kinds of stereoisomers due to its four asymmetric carbon atoms. On the other hand, there is no such a fatal defect when the compounds are produced by partial synthesis from steroid compounds with definite stereo-structures, which are easily obtainable from natural sources. Under such circumstances, it is clear that successful industrial production of estratriene compounds must be effected via the partial synthesis route.

A partially synthetic process for successfully producing estratriene, has involved aromatizing the A-ring of $\Delta^{1,4}$-3-keto steroid or $\Delta^{1,4,6}$-3-ketosteroid by pyrolysis, simultaneously with splitting off of the methyl radical at the 19-position. This reaction, however, proceeds under such drastic conditions as heating the material in a mineral oil at 600° C. and the yield is very low; such drastic conditions are inapplicable to many kinds of steroids. The reaction is visualized in the following scheme:

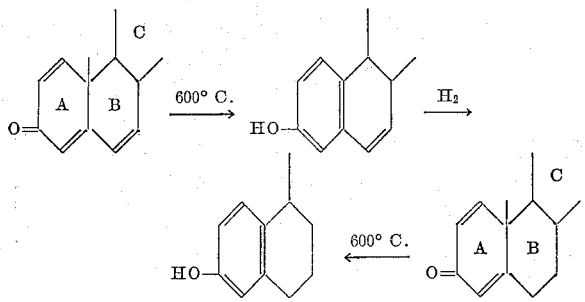

One of the present inventors and his co-workers previously found that 19-hydroxy-3-ketosteroids or their esters can be obtained on a large scale by oxygenating steroid compounds with fungi of genus Corticium or Pericularia. The present invention is based on a further development of this work, whereby the 19-substituent of $\Delta^{1,4}$-19-hydroxy-3-ketosteroids or their esters obtained by dehydrogenation of 19-hydroxysteroids or their esters can be easily removed and their A-ring can simultaneously be aromatized.

The present invention thus comprises a method for producing estratriene compounds, wherein $\Delta^{1,4}$-3-ketosteroids having in 19-position a hydroxyl group or a group derived therefrom are subjected to elimination of the 19-substituent and simultaneous aromatization of the A-ring.

According to H. H. Inhoffen et al. [Angewandte Chemie, vol. 53 (1940), p. 471 and Berichte der deutschen chemischen Gesellschaft, vol. 74 (1941), p. 1911], steroid compounds having a $\Delta^{1,4}$-3-keto structure have a tendency to be easily aromatized in their A-rings as is indicated in the following scheme:

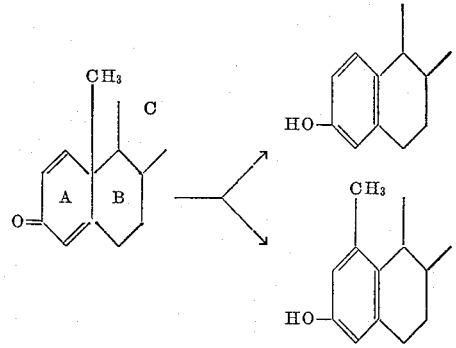

In this reaction, however, the methyl group is difficultly eliminated and therefore obstructs the aromatization, and also there is a fear of rearrangement of the methyl group from 10-position to 1-position.

On the other hand, in the molecules of $\Delta^{1,4}$-3-keto-19-hydroxy-steroids, the readily aromatizable $\Delta^{1,4}$-3-keto structure co-exists with the readily eliminable hydroxymethyl group of the 10-position. In other words the compounds have a $\Delta^{1,4}$-3-keto-19-hydroxy structure in the molecules and the structure is comparatively unstable, and therefore the compounds are convertible into more stable compounds through both elimination of formaldehyde and aromatization of the A-ring as shown in the following scheme:

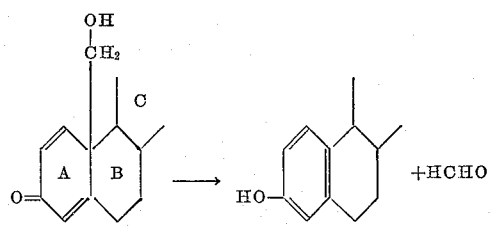

The same explanation as above is also applicable to the $\Delta^{1,4}$-3-keto-19-acyloxysteroids. But in the reaction of these compounds, hydrolysis occurs simultaneously, eliminating both formaldehyde and the acid corresponding to the acyl radical.

The reactions, elimination and aromatization, are brought about by an appropriate "activation" of the starting steroids. The action on the latter may take the form, for instance, of the addition of a small amount of an acid or alkaline substance, or of an ion-exchange, to the solution of the starting steroid. Or the solution of the starting steroid may be merely heated for the purpose. As the result of such a simple treatment, the unstable $\Delta^{1,4}$-3-keto-19-hydroxysteroids are "activated" and the reaction of the present invention can be brought about.

The reaction of the method of this invention may be conducted in a suitable solvent, for instance, lower fatty alcohols such as methanol and ethanol, ketones such as acetone and dioxane, and aromatic solvents such as benzene and xylene. Since the solvent is used only for bringing the material into intimate contact with the reagent or for keeping the reaction system homogeneous, any kind of solvent may be employed as long as it dissolves either the starting material or the reagent. When an alkaline or acid solvent is employed in the reaction, addition of any other reagent for initiating the action may be unnecessary. Among such acid or alkaline solvents are, for instance, pyridine bases, dimethyl formamide, lower fatty acids such as acetic acid, and mineral acids such as hydrochloric acid, sulfuric acid and chlorosulfonic acid.

The reaction may be effected without employing drastic conditions such as heating, stirring or the like. When the action is brought about by heating only, the temperature is not necessarily high. That is, this reaction can be conducted under extremely mild conditions, contrary to the known pyrolysis method reported by H. H. Inhoffen et al. supra. Therefore, even if the starting compound has unstable side chains or substituents, undesirable side reaction can be avoided in most cases, and the reaction proceeds in the desired direction, producing only the objective compounds.

The starting material, $\Delta^{1,4}$-3-ketone-19-hydroxysteroids, may have various kinds of substituents on the B-, C- and D-rings. The steroid compounds may belong to any of the cholestane-, cholanic acid-, pregnane-, androstane-, spirostane-series, etc., and the molecules may have such substituents as 17α-hydroxyl, 17β-acetyl, 17β-hydroxyacetyl, 17β-acyloxyacetyl, 17α-ethynyl, 17α-methyl, 17-oxo, 11β-hydroxy, 11α-hydroxy and 11-oxo radicals. Moreover, halogen atoms may be present as substituents in suitable positions of the nucleus. Such substances are new compounds obtained by the present inventors by dehydrogenation of 3-keto-(or $\Delta^4$-3-keto)-19-hydroxy-(or 19-acyloxy)-steroids produced by the biooxygenation of 3-ketosteroids with the enzyme of microörganisms of genus Corticium or genus Pericularia. The dehydrogenation of 19-hydroxysteroids may be carried out directly or indirectly. The direct dehydrogenation may be effected by an oxidizing agent such as selenium dioxide, selenious acid, dibenzoyl-oxyselenium oxide and lead tetraoxide, or by utilizing enzyme systems of fungi of genus Fusarium, genus Didymella or of Baccillus subtilis or sphaericus, etc. The method using an oxidizing agent may be conducted in a suitable solvent such as tertiary alcohols and aromatic solvents with heating, and the method using enzymes of microörgnaisms may be effected in the presence of extracted enzymes of the microörganisms themselves. The indirect dehydrogenation may be effected through compounds substituted by halogen or acyloxy at 2- and/or 4-positions.

The foregoing procedures are described in more detail in the following examples together with the examples of production of the starting material, but these are given by way of illustration and not for the purpose of limitation. In these examples, the analytical value is in percent, the specific rotation is measured as a dioxane solution, the ultraviolet absorption is observed as an ethanolic solution (referred to as EtOH) or ethanolic potassium hydroxide solution (referred to as EtOH.KOH), the infra-red absorption is observed as a suspension in liquid paraffin unless otherwise noted, using a sodium chloride prism.

Parts and percentages are by weight unless otherwise indicated, the relationship between parts by weight and parts by volume being the same as that between grams and milliliters. The temperatures are all in degrees centigrade and uncorrected.

*Example 1*

To a solution of 6 parts by weight of $\Delta^4$-pregnene-17α,19,21-triol-3,20-dione 19,21-diacetate in 100 parts by volume of tertiary amyl alcohol are added 2 parts by weight of powdery selenium dioxide, and the mixture is boiled for 4 hours. After the addition of additional 1.5 parts by weight of selenium dioxide, the mixture is further heated for 3 hours. The reaction mixture is cooled, the selenium separated is filtered off, and after distilling off the solvent, the residue is dissolved in ethyl acetate. The ethyl acetate solution is washed with an aqueous solution of sodium bicarbonate, dried over anhydrous sodium sulfate, and concentrated. The residue is recrystallized from a mixture of ether and ethyl acetate to give 4.5 parts by weight of $\Delta^{1,4}$-pregnadiene-17α,19,21-triol-3,20-dione 19,21-diacetate, M.P. 179–181°.

*Analysis*.—Calcd. for $C_{25}H_{34}O_7$: C, 67.24; H, 7.68. Found: C, 67.01; H, 7.08. Ultraviolet absorption:

$$\lambda^{EtOH}_{max.} \ 243 \ m\mu \ (\epsilon \ 15500)$$

To a solution of 0.250 part by weight of potassium hydroxide in 40 parts by volume of ethanol is added 1 part by weight of the above product, $\Delta^{1,4}$-pregnadiene-17α,19,21-triol-3,20-dione 19,21-diacetate. The crystals dissolve to yield a clear solution in about 5 minutes. After being left standing for further 15 minutes, the solution is neutralized with 10% hydrochloric acid, whereupon 0.850 part by weight of white crystals melting at 218–220° separate on the addition of water.

The product, when purified by recrystallization from a mixture of methanol and petroleum ether, shows M.P. 222.5–229° (decomp.), $$\lambda^{EtOH}_{max.} \ 280 \ m\mu \ (\epsilon \ 2200)$$

The ferric chloride-potassium ferricyanate reaction of the product gives a blue color, showing the existence of the phenol structure in the molecule, and the analytical value is in accord with $C_{20}H_{26}O_4$. Thus the product is $\Delta^{1,3,5(10)}$-19-norpregnatriene-3,17α,21-triol - 20-one. The product is a new compound having female sex hormone activity, and may be converted to estrone by the known methods for eliminating the 17-side chain. For example, (1) the product is reduced by sodium borohydrate to form $\Delta^{1,3,5(10)}$-19-norpregnatriene-3,17α,20,21-tetrol, and then the 20-ol is oxidized with a periodide, or (2) the product is oxidized with sodium bismuthate.

The estrone thus obtained shows M.P. 258–262°, and no depression of the melting point is observed when it is melted together with an authentic sample of estrone.

*Example 2*

To a solution of 0.050 part by weight of $\Delta^{1,4}$-pregnadiene-17α,19,21-triol-3,20-dione 19,21-diacetate, which is obtained in the first step of Example 1, in 3 parts by volume of methanol is added a solution of 0.1 part by volume of chlorosulfonic acid in 3 parts by volume of methanol. After being allowed to stand for a while, the mixture is poured into water to separate crystals. The mixture is extracted with ethyl acetate, and the ethyl acetate solution, after washing with an aqueous solution of sodium bicarbonate and water, successively, is evaporated to obtain 0.30 part by weight of $\Delta^{1,3,5(10)}$-19-norpregnatriene-3,17α,21-triol-20-one, having M.P. 221–225°, $$\lambda^{EtOH}_{max.} \ 280 \ m\mu \ (\epsilon \ 2200)$$

*Example 3*

The hydroxyacetyl and hydroxyl groups at the 17-position of $\Delta^4$-pregnene-17α,19,21-triol-3,20-dione are eliminated with sodium bismuthate to produce $\Delta^4$-androstene-19-ol-3,17-dione, and conventional benzoylation of the product gives the 19-benzoate thereof, showing M.P. 118–120° C.

Ultraviolet absorption:

$$\lambda^{EtOH}_{max.} \ 230 \ m\mu \ (\epsilon \ 28800) \text{(benzoyloxy)}$$

Infra-red absorption: max. 5.82 μ (17-ketone), 6.03 μ (3-ketone), 6.18 μ, 6.26 μ, 6.32 μ (double bonds).

To 0.500 part by weight of $\Delta^4$-androstadiene-19-ol-3,17-dione 19-benzoate are added 10 parts by volume of tertiary amyl alcohol and 0.500 part by weight of selenium dioxide, and the mixture is boiled for 3 hours. After removing the metallic selenium separated, the solvent is distilled off. A solution of the residue in ethyl acetate is washed with diluted aqueous solution of sodium hydroxide, and the solvent is removed by distillation. The residue is subjected to an absorption chromatography on alumina to separate $\Delta^{1,4}$-androstadiene-19-ol-3,17-dione 19-benzoate, M.P. 158–160° C.

Ultraviolet absorption:

$\lambda_{max.}^{EtOH}$ 230 m$\mu$ ($\epsilon$ 21000)

$\lambda_{max.}^{EtOH}$ 280 m$\mu$ (benzoic acid), 298–300 m$\mu$ (phenol)

Infra-red absorption observed as the potassium bromide disk: max. 5.81 $\mu$ (17-ketone), 6.00 $\mu$ (3-ketone), 6.15 $\mu$, 6.25 $\mu$ ($\Delta^{1,4}$), 11.24 $\mu$ ($\Delta^{1,4}$-3-ketone).

The above process may also be effected, using 1.5 parts by weight of dibenzoyloxyselenium oxide instead of 0.500 part by weight of selenium dioxide.

A solution of $\Delta^{1,4}$-androstadiene-19-ol-3,17-dione 19-benzoate in a methanolic 5% solution of potassium hydroxide is neutralized with acetic acid, and the solvent is distilled off. Recrystallization of the residue from a diluted ethanol gives estrone as colorless plates, melting at around 250–260°. The acetate thereof melts at 124–127°, and is in good accord with an authentic sample of estrone acetate in other properties.

All of the products obtained in the above examples have female sex hormone activity. Among them, estrone and its acetate are well known female sex hormones, and $\Delta^{1,3,5(10)}$-19-norpregnatriene-3,17$\alpha$,21-triol-20-one may be converted into estrone by splitting off its 17-substituents, if desired. $\Delta^{1,4}$-19-hydroxysteroids of pregnane or androstane series other than the starting compounds in the above examples can be converted, by a similar way to those described in the examples, into $\Delta^{1,3,5(10)}$-19-norsteroids. The products thus obtained are compounds having female sex hormone activity, or are compounds changeable into such compounds by a known process. Use for either of the medical and veterinary purposes is found in these compounds having the hormone activity, to say nothing of estrone.

Having thus disclosed the invention, what is claimed is:

1. $\Delta^{1,4}$ - pregnadiene - 17$\alpha$,19,21 - triol - 3,20 - dione 19,21 - diacetate.

2. $\Delta^{1,4}$ - pregnadiene - 17$\alpha$,19,21 - triol - 3,20 - dione.

3. $\Delta^{1,4}$ - androstadiene - 19 - ol - 3,17 - dione 19 - benzoate.

4. A process for producing $\Delta^{1,3,5(10)}$-19-norpregnatriene-3,17$\alpha$,21-triol-20-one, which comprises subjecting $\Delta^{1,4}$ - pregnadiene - 17$\alpha$,19,21 - triol - 3,20 - dione 19,21-diacetate to the action of hydrochloric acid.

5. A process for producing $\Delta^{1,3,5(10)}$-3-hydroxy-norpregnenes, which comprises subjecting a member selected from the group consisting of the 19-acetates and 19-benzoates of the corresponding $\Delta^{1,4}$-3-keto-19-hydroxypregnenes to hydrolysis by the action of a member selected from the group consisting of hydrochloric and chlorosulfonic acid, and then subjecting the resultant hydrolysate to the elimination of formaldehyde and simultaneous aromatization by the same member selected from the group consisting of hydrochloric acid and chlorosulfonic acid in the same reaction mixture.

6. A process for producing $\Delta^{1,3,5(10)}$-3-hydroxy-norpregnenes, which comprises subjecting a member selected from the group consisting of the 19-acetates and 19-benzoates of the corresponding $\Delta^{1,4}$-3-keto-19-hydroxypregnenes to hydrolysis by the action of alkali metal hydroxide, and then subjecting the resultant hydrolysate to the elimination of formaldehyde and simultaneous aromatization by the said alkali metal hydroxide in the same reaction mixture.

7. A process for producing $\Delta^{1,3,5(10)}$-19-norandrostatrien-3-ol-17-one, which comprises subjecting $\Delta^{1,4}$-androstadien-19-ol-3,17-dione-19 benzoate to the action of alkali metal hydroxide.

References Cited in the file of this patent

UNITED STATES PATENTS

| | | |
|---|---|---|
| 2,609,377 | Ehrenstein | Sept. 2, 1952 |
| 2,666,769 | Colton | Jan. 19, 1954 |
| 2,753,342 | Djerassi et al. | July 3, 1956 |
| 2,819,276 | Mihina | Jan. 7, 1958 |
| 2,819,277 | Colton | Jan. 7, 1958 |
| 2,840,581 | Hogg et al. | June 24, 1958 |
| 2,910,486 | Jiu | Oct. 27, 1959 |

OTHER REFERENCES

Barber et al.: J. Org. Chem., vol. 19, pages 1758–1765. (1954).

UNITED STATES PATENT OFFICE
CERTIFICATE OF CORRECTION

Patent No. 3,006,931            October 31, 1961

Masamoto Nishikawa et al.

It is hereby certified that error appears in the above numbered patent requiring correction and that the said Letters Patent should read as corrected below.

Column 1, lines 51 to 57, the left-hand formula should appear as shown below instead of as in the patent:

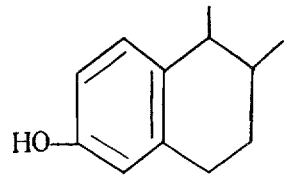

Signed and sealed this 8th day of May 1962.

(SEAL)
Attest:
ERNEST W. SWIDER
Attesting Officer

DAVID L. LADD
Commissioner of Patents